(12) United States Patent  
Bastian, II

(10) Patent No.: US 9,409,728 B2  
(45) Date of Patent: Aug. 9, 2016

(54) AUTOMATED CASE FLOW BUFFER

(71) Applicant: Bastian Solutions, LLC, Indianapolis, IN (US)

(72) Inventor: William A. Bastian, II, Carmel, IN (US)

(73) Assignee: BASTIAN SOLUTIONS, LLC, Indianapolis, IN (US)

( * ) Notice: Subject to any disclaimer, the term of this patent is extended or adjusted under 35 U.S.C. 154(b) by 0 days.

(21) Appl. No.: 14/531,320

(22) Filed: Nov. 3, 2014

(65) Prior Publication Data

US 2016/0122135 A1    May 5, 2016

(51) Int. Cl.
*B65G 1/00* (2006.01)
*B65G 47/69* (2006.01)
*B65G 37/00* (2006.01)

(52) U.S. Cl.
CPC ............... *B65G 47/69* (2013.01); *B65G 37/00* (2013.01)

(58) Field of Classification Search
CPC ............ B65G 1/00; B65G 1/02; B65G 1/023; B65G 1/0485; B65G 1/12
USPC ............ 198/347.1–347.4; 414/281, 282, 283, 414/284
See application file for complete search history.

(56) References Cited

U.S. PATENT DOCUMENTS

| | | | |
|---|---|---|---|
| 4,465,417 A * | 8/1984 | Baumann | B61B 12/022 198/347.1 |
| 5,328,316 A | 7/1994 | Hoffmann | |
| 5,588,790 A * | 12/1996 | Lichti | B65G 1/133 198/333 |
| 5,953,234 A | 9/1999 | Singer et al. | |
| 6,425,226 B1 | 7/2002 | Kirschner | |
| 6,671,580 B2 * | 12/2003 | Campbell | G11B 15/6835 318/567 |
| 6,782,990 B2 * | 8/2004 | Joutsjoki | B65G 47/5113 198/347.4 |
| 6,824,345 B2 | 11/2004 | Hansl et al. | |
| 6,929,440 B1 | 8/2005 | Grond | |
| 7,826,919 B2 | 11/2010 | D'Andrea et al. | |

(Continued)

FOREIGN PATENT DOCUMENTS

WO    WO 2009/089159 A2    7/2009
WO    WO 2011/119296 A2    9/2011

OTHER PUBLICATIONS

Mail Matrix brochure (Opex Corporation). [retrieved May 2, 2012]. 4 pages. Retrieved from the Internet: <URL: http://http://opex.com/assets/documents/2012-06-27_Mail_Matrix_brochure_updated.pdf>.

(Continued)

*Primary Examiner* — James R Bidwell
(74) *Attorney, Agent, or Firm* — Woodard Emhardt Moriarty McNett and Henry LLP

(57) ABSTRACT

An automated flow buffer system includes infeed and discharge shuttle systems. A buffering system is disposed between the infeed shuttle system and the discharge shuttle system. The buffering system includes buffer conveyors arranged in an array to buffer one or more items. The infeed shuttle system and the discharge shuttle system each include a shuttle frame disposed proximal to an end of the buffering system and one or more shuttles independently moveable along the shuttle frame. Each of the shuttles include a drive system configured to move the shuttle in horizontal and vertical directions along the shuttle frame so that the shuttle is able to service the conveyors in the buffering system. The shuttle includes a conveyance mechanism upon which one or more of the items are transported. The conveyance mechanism is configured to convey the items to and/or from the buffer conveyors of the buffering system.

46 Claims, 11 Drawing Sheets

(56) References Cited

U.S. PATENT DOCUMENTS

| | | | |
|---|---|---|---|
| 7,861,844 B2 | 1/2011 | Hayduchok et al. | |
| 8,104,601 B2 | 1/2012 | Hayduchok et al. | |
| 8,276,739 B2 | 10/2012 | Bastian, II et al. | |
| 8,276,740 B2 | 10/2012 | Hayduchok et al. | |
| 8,590,690 B2 | 11/2013 | Benz et al. | |
| 2001/0037305 A1 | 11/2001 | Mochizuki | |
| 2005/0047895 A1* | 3/2005 | Lert | B65G 1/0492 414/273 |
| 2006/0070847 A1* | 4/2006 | Besch | B65G 1/0492 198/347.4 |
| 2010/0243406 A1 | 9/2010 | Mersnik | |
| 2010/0322746 A1 | 12/2010 | Lert et al. | |
| 2011/0008138 A1 | 1/2011 | Yamashita | |
| 2012/0186192 A1 | 7/2012 | Toebes et al. | |
| 2014/0124332 A1 | 5/2014 | Hayduchok et al. | |
| 2014/0124462 A1 | 5/2014 | Yamashita | |
| 2014/0190366 A1 | 7/2014 | Mukai et al. | |
| 2014/0257555 A1 | 9/2014 | Bastian, II et al. | |

OTHER PUBLICATIONS

Perfect Pick—Delivering an automated, high-speed, goods-to-person picking solution to the material handling industry (Opex Corporation). 4 pages. [retrieved Mar. 8, 2013]. Retrieved from the Internet: <URL: http://http://opex.com/assets/documents/perfect-pick-brochure.pdf >.

U.S. Appl. No. 13/789,840 to Bastian, II et al., Notice of Allowance mailed Apr. 21, 2015.

U.S. Appl. No. 13/789,840 to Bastian, II et al., Office Action mailed Dec. 10, 2014.

A healthy injection. iHerb's supply chain gets a vitamin boost . . . DCVelocity.com, p. 70, Jan. 2014. 1 page [retrieved Jun. 4, 2014]. Retrieved from the Internet: <URL: http://http://www.dcvelocity.com/files/pdfs/velocityvideo/2014/20140101/vv201401_iherb.pdf>.

iHerb.com opens new facility in Hebron, KY to support CA facility. 2 pages [retrieved Jun. 4, 2014] <URL:http://www.bastiansolutions.com/docs/default-source/case-study-summaries/iherb-case-study.pdf?sfvrsn=2>.

Mail Matrix . . . deliver like never before, 2007, [online]. 4 pages [retrieved on May 29, 2014] Retrieved from Opex Corporation using Internet <URL:http://opex.com/assets/documents/2012-06-27_Mail_Matrix_brochure_updated.pdf>.

Perfect Pick. Announcing Perfect Pick. 2 page [retrieved on Jun. 4, 2014] Retrieved from Opex Corporation using Internet <URL: http://opex.com/assets/documents/perfect-pick-specs.pdf>.

Perfect Pick. Delivering an automated, high-speed, goods-to-person picking solution to the material handling industry, 2013. 4 pages [online], [retrieved on May 29, 2014] Retrieved from Opex Corporation using Internet <URL: http://opex.com/assets/documents/perfect-pick-brochure.pdf>.

Perfect Pick. Improve order fulfillment with automated, goods-to-person picking. 3 pages [retrieved Jun. 5, 2014] <URL: http://www.bastiansolutions.com/automation/goods-to-person/perfect-pick>.

* cited by examiner

AUTOMATED CASE FLOW BUFFER

BACKGROUND

When Retailers order from a Wholesaler they typically request a partial pallet quantity of mixed "Stock Keeping Units" or "SKUs". The Retailer has limited storage space so deliveries of "Mixed SKU Partial Pallets" from the Wholesaler often occur one to two times a week. When the pallet is received by the Retailer the cases often go directly to the store shelves for sale and consumption by customers. Based on this demand by the Retailers the Wholesaler must develop processes to take inbound "Single SKU Full Pallets" and covert them to "Mixed SKU Partial Pallets" with as little labor as possible. The SKUs are often picked in a "First Expired, First Out" or "FEFO" methodology to prevent spoilage of food products and the cases are loaded into the transport trailers in reverse drop sequence so that cases loaded last are the first stop or drop-off point of the trailer. Considering the sequence requirements of the Wholesaler to accommodate: FEFO, reverse drop sequence, and specific mixed SKU's for each stop, sequencing of cases with minimal labor becomes very important. Manual methods of building "Mixed SKU Partial Pallets" can be back breaking work with inconsistent productivity rates between pickers. Processing mixed pallets, which are commonly required for grocery stores, convenience stores, liquor stores, and industrial settings, can slow order fulfillment cycle times for shipping. These slow cycle times for both warehousing and shipping impact customer service levels. The quicker that goods can be processed and loaded onto trucks, trains, or other transports, the larger geographical area a distribution center or warehouse can service. For example, the quicker a truck can be loaded and unloaded, the more time is available for transport. Therefore a larger service territory the distribution center is able to service because the truck can cover a greater distance in the same amount of time. Another concern is proper sequencing so that the SKUs are loaded in the proper order onto the truck or other transport. If the SKUs are not loaded in the proper sequence, inefficiencies and other issues can occur. For instance, space can be wasted on the truck, SKUs can be damaged, and/or unloading of the truck may be more difficult.

Thus, there is a need for improvement in this field.

SUMMARY

A unique accumulating case flow buffer ("automated case flow buffer") has been developed to address the above-discussed issues as well as other issues. For instance, the case flow buffer is capable of quickly and efficiently sequencing SKUs for building mixed pallets and/or loading a trailer in the proper sequence with high throughput and minimal labor. In one example, the case flow buffer can be configured for use with a variety of different types and sizes of package cases often found in the beverage, food, or other industries. The case flow buffer includes a receiving or infeed vertical shuttle system, a matrix of horizontal accumulation conveyors (buffer), and a discharge vertical shuttle system. The case flow conveyor also includes a vertical case shuttle system on either side of the vertical storage rack system for loading and unloading SKUs. The vertical case shuttle systems each include a plurality of vertical transports or shuttles that are able to move horizontally and vertically to deliver or pick the case from the appropriate horizontal buffer conveyor. The shuttles are able to load and unload cases at a single location within the vertical case shuttle system.

In one embodiment, singulated inbound cases are directed to an infeed vertical shuttle system. During operation, layers of depalletized SKUs are transported on the on-ramp infeed conveyor and distributed onto a plurality of feeder transfer conveyors to the vertical shuttle. The plurality of feeder conveyors distribute the SKUs to the shuttles in parallel to reduce cycle times. The shuttles then move horizontally and vertically to transfer the SKUs to the designated horizontal conveyor for accumulated buffering storage. Similarly, the case conveyor can include a discharge conveyor that connects to a second outbound vertical shuttle system. The shuttles in the second conveyor system move horizontally and vertically to transfer the SKUs from the designated horizontal buffer conveyor lane in exact order case sequence to a dispensing discharge conveyor for building mixed pallets or loading trailers in a specific case sequence, normally reverse drop or stop sequence.

The vertical shuttles include electric motors to allow case transport belts on the shuttles to operate at a speed independent of the traveling speed of the feeder conveyors or dispensing conveyors. This allows SKUs to be loaded and unloaded at different speeds by changing the speed of the shuttle belt(s). The system also allows greater flexibility in locating where SKUs are loaded and unloaded because it does not rely on mechanical interfaces for designating loading/unloading stations. Instead, the individual locations can be set by a simple software change. The individual shuttles are controlled via wireless communication. Often the shuttle belt bed will move two (2) or more cases at a time for improved throughput.

The automated case flow buffer can also sort SKUs from an inbound mixed pallet onto a plurality of horizontal buffer conveyors for storage of the sorted SKUs (returns). This automated case flow buffer can also sort SKUs into mixed pallets for outbound shipment. Also, the automated case flow buffer system has a tight footprint and excellent cube utilization as compared to other case flow buffer systems, thereby decreasing the amount of warehouse space required to store and dispense the SKUs.

In one configuration, upstream of the automated case flow buffer is a robotic layer depalletizer and case singulator, and downstream of the automated case flow buffer is either an accumulation conveyor going to trailers at the shipping docks or a robotic mixed case pallet building system (or both).

The automated case flow buffer as described and illustrated herein concerns a number of unique and inventive aspects. Some, but by no means all, of these unique aspects are summarized below.

Aspect 1 concerns an automated case flow buffer system, including an infeed shuttle system; a discharge shuttle system; a buffering conveyor system disposed between the infeed shuttle system and the discharge shuttle system, the buffering system including a plurality of buffer conveyors arranged in an array to buffer one or more cases; and the infeed shuttle system and the discharge shuttle system each including a shuttle frame disposed proximal to an end of the buffering system, and one or more shuttles independently moveable along the shuttle frame, each of the shuttles including a drive system configured to move the shuttle in a horizontal direction and a vertical direction along the shuttle frame so that the shuttle is able to service the conveyors in the buffering system, and a conveyance mechanism upon which one or more of the items are transported, the conveyance mechanism being configured to convey the items to and/or from the buffer conveyors of the buffering system.

Aspect 2 concerns the system of aspect 1, wherein the infeed shuttle system and the discharge shuttle are disposed at opposite ends of the buffering system to enhance buffering of the items in the shuttle system.

Aspect 3 concerns the system of aspect 1, including an infeed conveyor system configured to convey the items to the infeed shuttle system; and a discharge conveyor system configured to convey the items from the discharge shuttle system.

Aspect 4 concerns the system of aspect 3, wherein the infeed conveyor system includes an infeed conveyor, and one or more infeed lanes extending from the infeed conveyor to the infeed shuttle system.

Aspect 5 concerns the system of aspect 4, wherein the infeed conveyor system includes two or more of the infeed lanes to enhance sequencing and throughput of the items into the infeed shuttle system.

Aspect 6 concerns the system of aspect 1, including a buffer lane conveyor system configured to convey the items to the discharge shuttle system; and a discharge conveyor system configured to convey the items from the discharge shuttle system.

Aspect 7 concerns the system of aspect 6, wherein the discharge conveyor system includes a discharge conveyor, and one or more discharge lanes extending from the discharge conveyor to the discharge shuttle system.

Aspect 8 concerns the system of aspect 7, wherein the discharge conveyor system includes two or more of the discharge lanes to enhance sequencing of the items into the discharge shuttle system.

Aspect 9 concerns the system of aspect 1, wherein the shuttle frame further includes at least one conveyor transfer section; at least one departure travel lane; at least one return travel lane; wherein the departure travel lane and the return travel lane are located at opposite ends of the transfer section; wherein the shuttles are configured to move in a vertical direction along the departure and return travel lanes; and a plurality of buffer transfer sections disposed between the departure travel lane and the return travel lane, wherein each of the buffer transfer sections is aligned with a corresponding level of buffer conveyors so that the shuttles are able to service the buffer conveyors.

Aspect 10 concerns the system of aspect 9, wherein the shuttle frame further includes one or more switches configured to transition the shuttles from the departure and return travel lanes to the buffer conveyor transfer sections.

Aspect 11 concerns the system of aspect 9, wherein the return and departure travel lanes are unaligned with the buffer conveyors of the buffering system so that the shuttles on the return and departure travel lanes are unable to service the buffer conveyors to reduce bottlenecks.

Aspect 12 concerns the system of aspect 11, wherein the conveyor transfer section is unaligned with the buffer conveyors of the buffering system so that the shuttles on the conveyor transfer section are unable to service the buffer conveyors to reduce bottlenecks.

Aspect 13 concerns the system of aspect 1, wherein the buffering conveyor system is raised to form a vertical opening for facilitating maintenance lift movement under the buffering system.

Aspect 14 concerns the system of aspect 1, wherein the array includes a plurality of rows and levels of the buffer conveyors.

Aspect 15 concerns a method including loading one or more items onto an infeed shuttle of an infeed shuttle system; moving the infeed shuttle in a vertical direction in the infeed shuttle system to a level of a buffering system that includes an array of buffer conveyors arranged in multiple rows and levels; moving the infeed shuttle in a horizontal direction to one of the buffer conveyors on the level; transferring the items from the infeed shuttle to the buffer conveyor via a conveyance mechanism of the infeed shuttle; buffering the items on the buffer conveyor of the buffering system; transferring the items from the buffer conveyor to a discharge shuttle of a discharge shuttle system, wherein the buffering system is sandwiched between the infeed shuttle system and the discharge shuttle system; moving the discharge shuttle to a transfer section of the discharge shuttle system; and unloading the items from the discharge shuttle at the transfer section of the discharge shuttle system.

Aspect 16 concerns the method of aspect 15, including conveying the items to the infeed shuttle system with an infeed conveyor system; and conveying the items from the discharge shuttle system with a discharge conveyor system.

Aspect 17 concerns the method of aspect 16, including sequencing the items with two or more infeed lanes of the infeed conveyor system; and sequencing the items with two or more discharge lanes of the discharge conveyor system.

Aspect 18 concerns the method of aspect 15, including wherein the infeed shuttle system and the discharge shuttle system each include a conveyor transfer section, a departure travel lane, and a return travel lane that are offset from the buffering system; and recirculating the shuttles of the infeed shuttle system and the discharge shuttle system along the conveyor transfer section, the departure travel lane, and the return travel lane without transferring the items to the buffer conveyors of the buffering system.

Aspect 19 concerns the method of aspect 15, including moving a second infeed shuttle with one or more second items to a second one of the buffer conveyors on a second different level; and transferring the items from the second infeed shuttle to the second buffer conveyor.

Aspect 20 concerns the method of aspect 15, including transitioning the infeed shuttle from the vertical direction to the horizontal direction by activating one or more switches in the infeed shuttle system before said moving the infeed shuttle in the horizontal direction.

Aspect 21 concerns a method of operating the system in accordance with any one of aspects 1-14.

Aspect 22 concerns an automated flow buffer system configured to operate in accordance with the method of any one of aspects 15-19.

Aspect 23 concerns the system of any preceding aspect, wherein the infeed shuttle system and the discharge shuttle are disposed at opposite ends of the buffering system to enhance buffering of the items in the shuttle system.

Aspect 24 concerns the system of any preceding aspect, including an infeed conveyor system configured to convey the items to the infeed shuttle system; and a discharge conveyor system configured to convey the items from the discharge shuttle system.

Aspect 25 concerns the system of any preceding aspect, wherein the infeed conveyor system includes an infeed conveyor, and one or more infeed lanes extending from the infeed conveyor to the infeed shuttle system.

Aspect 26 concerns the system of any preceding aspect, wherein the infeed conveyor system includes two or more of the infeed lanes to enhance sequencing of the items into the infeed shuttle system.

Aspect 27 concerns the system of aspect 1, including a discharge conveyor system configured to convey the items to the discharge shuttle system; and a discharge conveyor system configured to convey the items from the discharge shuttle system.

Aspect 28 concerns the system of any preceding aspect, wherein the discharge conveyor system includes a discharge conveyor, and one or more discharge lanes extending from the discharge conveyor to the discharge shuttle system.

Aspect 29 concerns the system of any preceding aspect, wherein the discharge conveyor system includes two or more of the discharge lanes to enhance sequencing of the items into the discharge shuttle system.

Aspect 30 concerns the system of any preceding aspect, wherein the shuttle frame further includes at least one conveyor transfer section; at least one departure travel lane; at least one return travel lane; wherein the departure travel lane and the return travel lane are located at opposite ends of the transfer section; wherein the shuttles are configured to move in a vertical direction along the departure and return travel lanes; and a plurality of buffer transfer sections disposed between the departure travel lane and the return travel lane, wherein each of the buffer transfer sections is aligned with a corresponding level of buffer conveyors so that the shuttles are able to service the buffer conveyors.

Aspect 31 concerns the system of any preceding aspect, wherein the shuttle frame further includes one or more switches configured to transition the shuttles from the departure and return travel lanes to the buffer transfer sections.

Aspect 32 concerns the system of any preceding aspect, wherein the return and departure travel lanes are unaligned with the buffer conveyors of the buffering system so that the shuttles on the return and departure travel lanes are unable to service the buffer conveyors to reduce bottlenecks.

Aspect 33 concerns the system of any preceding aspect, wherein the conveyor transfer section is unaligned with the buffer conveyors of the buffering system so that the shuttles on the conveyor transfer section are unable to service the buffer conveyors to reduce bottlenecks.

Aspect 34 concerns the system of any preceding aspect, wherein the buffering system is raised to form a cavity for facilitating movement under the buffering system.

Aspect 35 concerns the system of any preceding aspect, wherein the array includes a plurality of rows and levels of the buffer conveyors.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
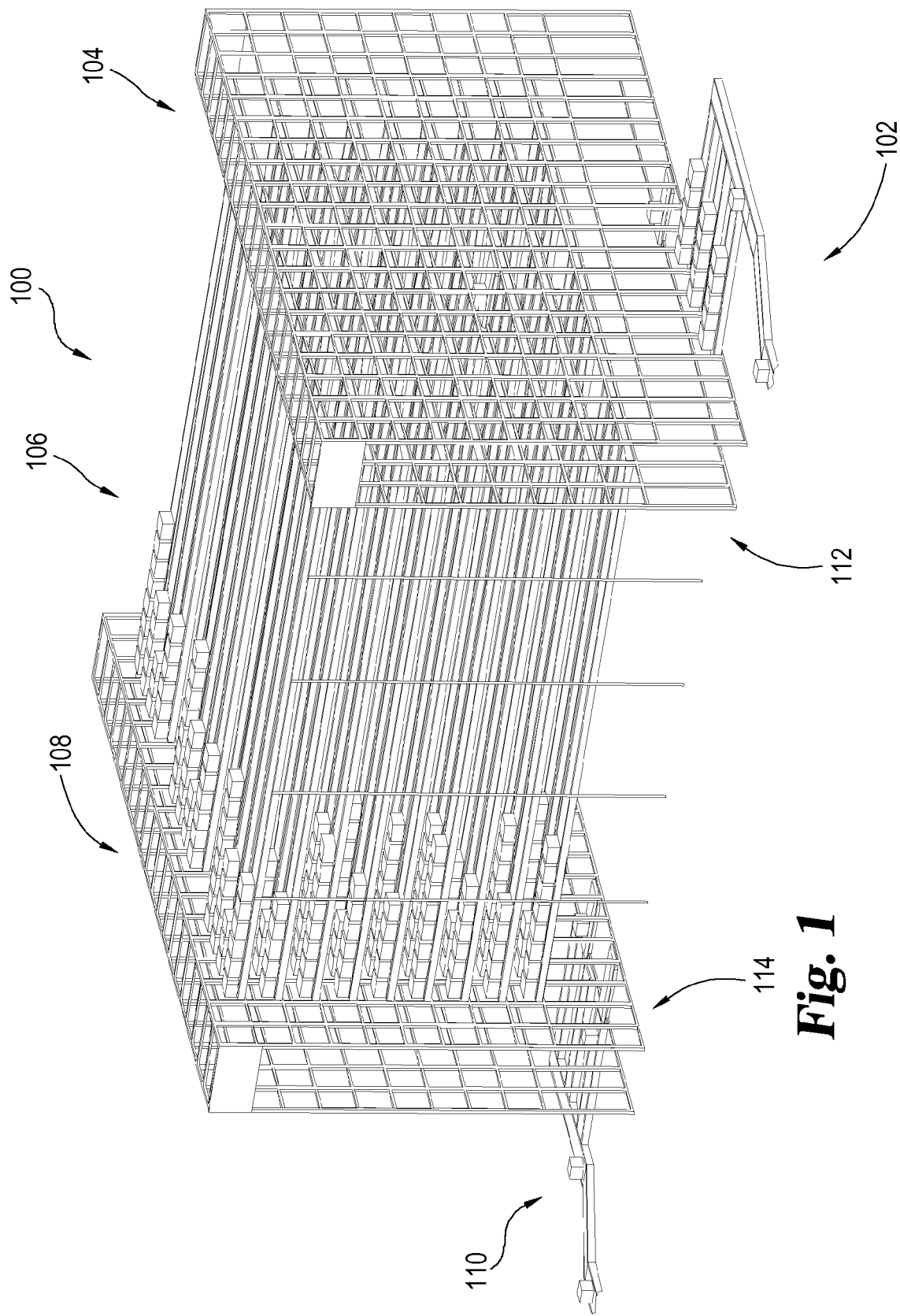
FIG. 1 is a perspective view of an automated flow buffer system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 shows a perspective view of one example of an automated case flow buffer system 100. As shown, the flow buffer system 100 includes an infeed conveyor system 102 that feeds items or SKUs, such as cases, boxes, containers, bags, etc., to an infeed shuttle system 104. The flow buffer system 100 further includes an infeed shuttle system 104 that feeds the SKUs to a buffering system 106. The buffering system 106 is used to store or buffer SKUs until the SKUs are needed, such as to fulfill an order for shipping or to build mixed pallets. A discharge shuttle system 108 of the flow buffer system 100 is positioned to transport SKUs from the buffering system 106 to a discharge conveyor system 110. As can be seen, the buffering system 106 is sandwiched between the infeed shuttle system 104 and the discharge shuttle system 108. In particular, the infeed shuttle system 104 is positioned at an infeed end 112 of the buffering system 106, and the discharge shuttle system 108 is disposed at a discharge end 114 of the buffering system 106. This configuration creates a first in first out (FIFO) arrangement of the SKUs which in turn reduces the risk of spoilage of SKUs as well as helps improve throughput.

Figure 2:
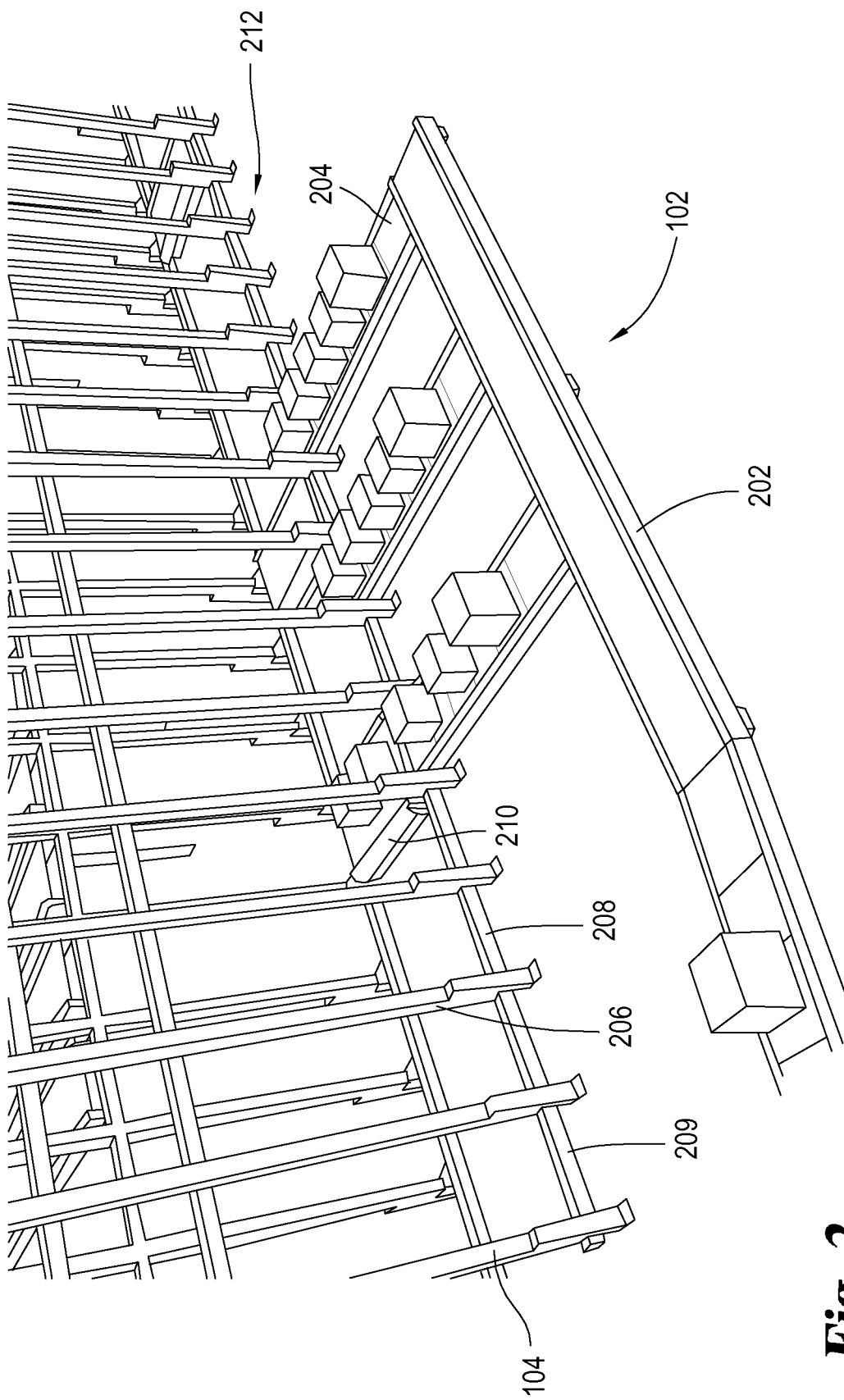
FIG. 2 is an enlarged perspective view of an infeed conveyor system used in the FIG. 1 flow buffer system.

FIG. 2 illustrates an enlarged perspective view of the infeed conveyor system 102. As depicted, the infeed conveyor system 102 includes an infeed conveyor 202 and one or more infeed lane conveyors or staging sections 204 that feed SKUs from the infeed conveyor 202 to the infeed shuttle system 104. In the illustrated example, the infeed conveyor system 102 includes three (3) infeed lane conveyors 204. By having two (2) or more infeed lane conveyors 204, the infeed conveyor system 102 can presort SKUs before the SKUs are supplied to the infeed shuttle system 104. This ability to presort SKUs enhances throughput in the infeed shuttle system 104 by allowing two (2) or more SKUs to be transported at the same time via the infeed shuttle system 104. Having multiple infeed lane conveyors 204 also helps to enhance sequencing of SKUs as the SKUs are transported via the infeed shuttle system 104. However, it should be recognized that in other examples the infeed conveyor system 102 can include more or less infeed lane conveyors 204 than is shown. For instance, the infeed conveyor system 102 in other examples can include a single infeed lane conveyor 204 or more than three (3) infeed lane conveyors 204. As depicted in FIG. 2, the infeed shuttle system 104 includes a shuttle frame 206 with one or more tracks 208 with one or more rails 209 upon which one or more shuttles 210 ride. As shown, the shuttles 210 ride along a transfer section 212 of the tracks 208 and are positioned or aligned with the corresponding infeed lane conveyors 204 so that the SKUs can be loaded onto the shuttles 210. The discharge shuttle system 108 incorporates similar tracks 208 and shuttles 210.

Figure 3:
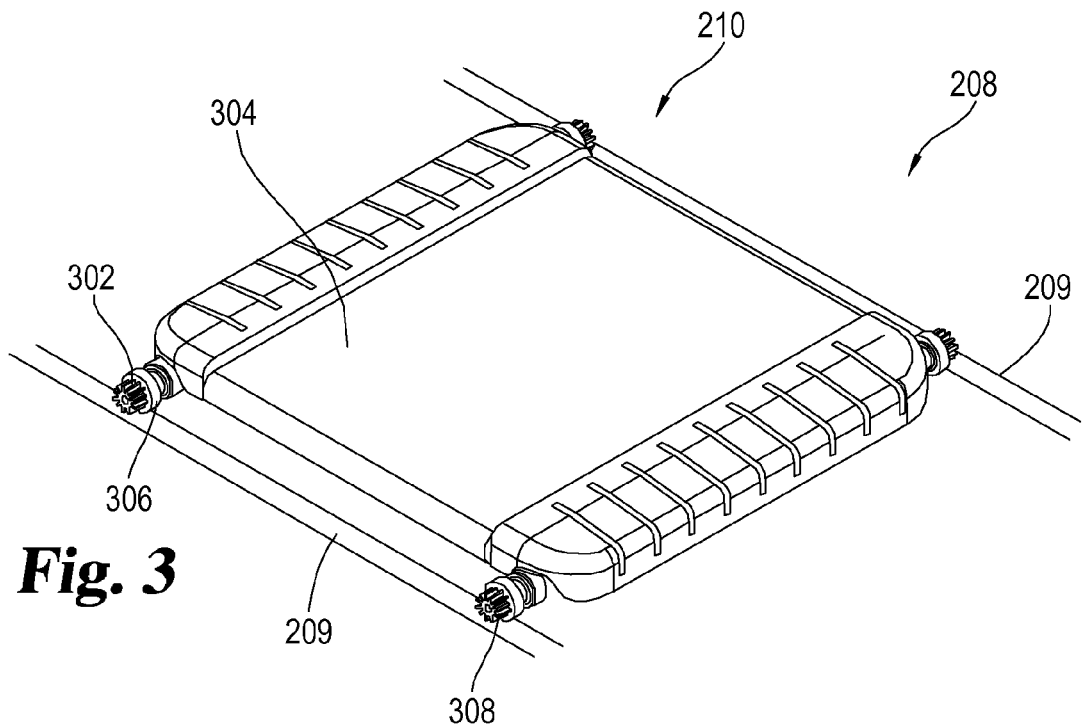
FIG. 3 is a perspective view of a shuttle used in a shuttle system of the FIG. 1 flow buffer system.

FIG. 3 shows a perspective view of the shuttle 210 riding on the track 208. The components and functional features of the shuttle 210 will be briefly described below. For a more detailed discussion of the shuttle 210, please refer to U.S. patent application Ser. No. 13/789,840, filed Mar. 8, 2013, which is hereby incorporated by reference. In the illustrated example, the track 208 includes a pair of rails 209 upon which the shuttle 210 moves. Each shuttle 210 is self sufficient such that it is able to perform various conveyance tasks independently of other shuttles 210. The shuttle 210 includes a drive system 302 for moving the shuttle 210 along the track 208 and a carrier section 304 for carrying as well as loading and unloading various SKUs at various service locations. As particularly shown, the drive system 302 includes wheels 306 with drive teeth 308 that propel the shuttle 210 along the tracks 208.

Figure 4:
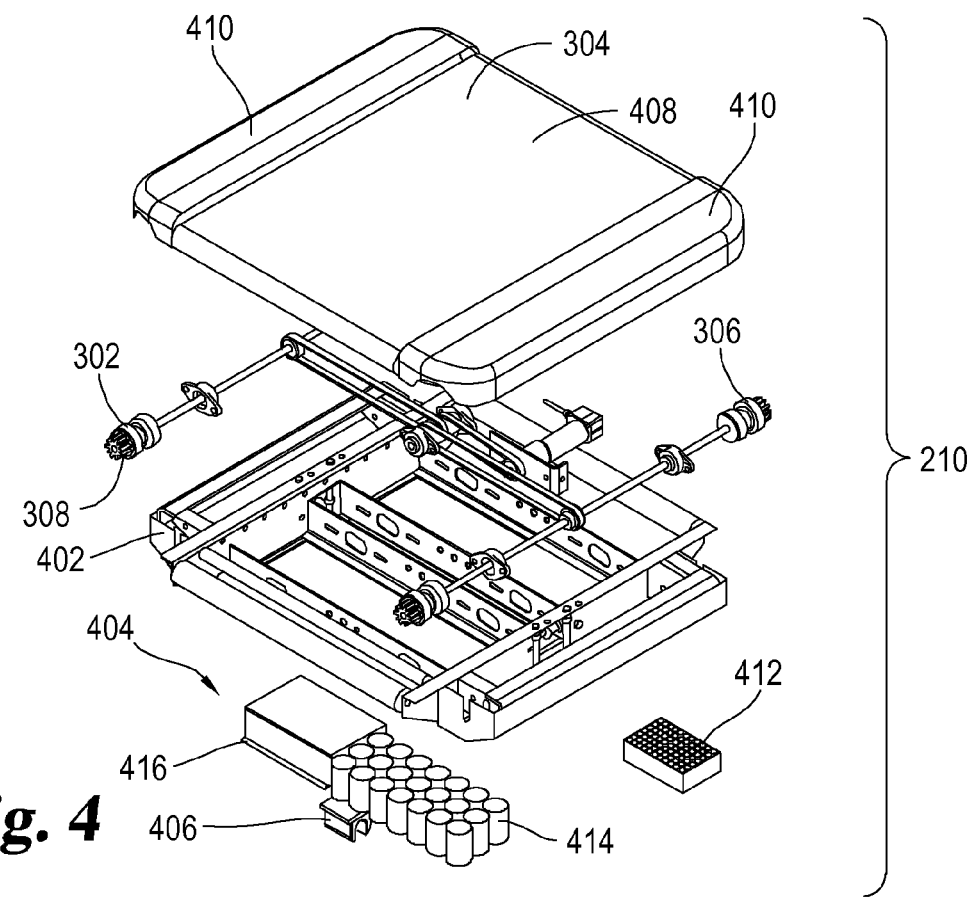
FIG. 4 is an exploded view of the FIG. 3 shuttle.

FIG. 4 shows an exploded view of the shuttle 210. Looking at FIG. 4, the shuttle 210 includes the drive system 302, the carrier section 304, a support frame 402, a controller 412, an energy storage system 404, and a charge coupling 406. As mentioned before, the drive system 302 is used to move the shuttle 210 along the track 208, and the carrier section 304 is used to carry SKUs as well as to load and unload SKUs. The carrier section 304 includes a conveyance mechanism 408 for loading/unloading SKUs and one or more drive covers 410 that help to protect the drive system 302 as well as the rest of the components of the shuttle 210. In the illustrated example, the conveyance mechanism 408 includes a belt-type conveyor in which a conveyor belt is wrapped around one or more rollers. However, it should be recognized that other types of conveyance mechanisms can be used. The support frame 402 is used to provide structural support for the components of the shuttle 210. As shown, the carrier section 304 and the drive system 302 are secured to the support frame 402. Moreover, the energy storage system 404 and controller 412 are held within the support frame 402. It should be recognized that the various components of the shuttle 210 can be secured in any number of manners to the support frame 402 such as through mechanical fasteners, adhesive, etc. The controller 412 is used to control the operation of the shuttle 210. For example, the controller 412 controls the movement of the shuttle 210 via the drive system 302 and controls the loading/unloading of items 112 via the carrier section 304. It should be recognized that the controller 412 is operatively connected to the various components of the shuttle 210 through wired and/or wireless connections.

With continued reference to FIG. 4, the energy storage system 404 stores and provides power for the rest of the systems in the shuttle 210. For example, the energy storage system 404 provides power to the drive system 302 and the carrier section 304. As shown, the energy storage system 404 includes a storage pack 414 for storing energy and an inverter 416 that is operatively connected to the storage pack 414 for converting energy received by the charge coupling 406. In one example, the storage pack 414 includes a bank of ultracapacitors, and in another example, the storage pack 414 includes a battery array. Other forms for storing potential energy are contemplated, such as pressurized tanks, mechanical springs, and the like. The energy pick up 406 is used to charge the energy storage system 404 via the inverter 416. In one example, the energy pick up 406 is U-shaped and positioned on the bottom of the shuttle 210 for inductive or contactless power transfer to the shuttle 210. The energy pick up 406 is designed to receive a charging rail from the track 208 so as to inductively recharge the energy storage system 404. It is contemplated that other types of systems can be used for charging the shuttle 210, such as through brush contacts and optical charging systems, to name just a few examples.

Figure 5:
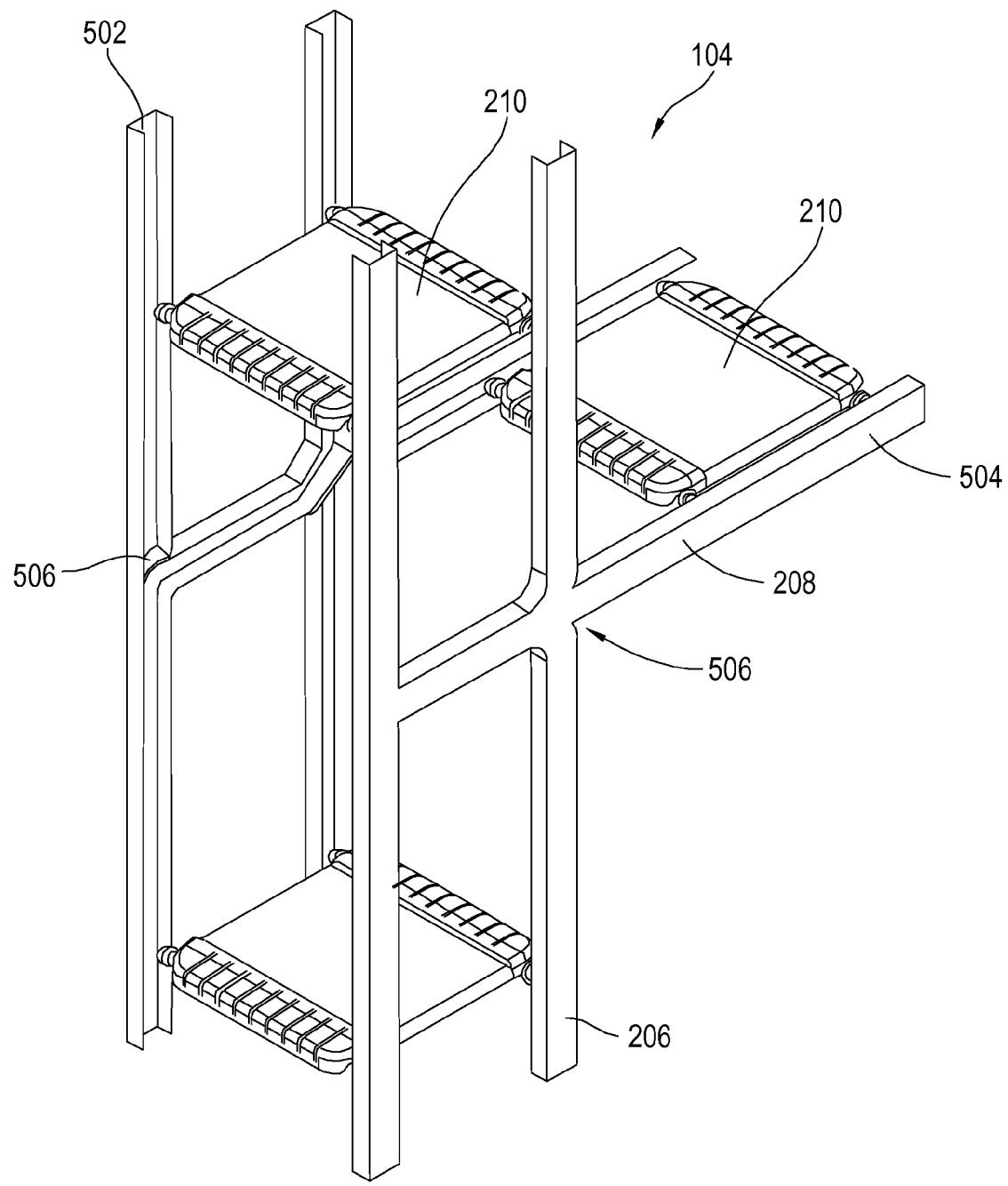
FIG. 5 is a perspective view of a portion of a shuttle system used in the FIG. 1 flow buffer system.

FIG. 5 illustrates an enlarged perspective view of a portion of the shuttle frame 206 for the infeed shuttle system 104. Again, the shuttle frame 206 for the discharge shuttle system 108 is configured in a similar fashion as shown in FIG. 5. As can be seen, the tracks 208 for the shuttle frame 206 include one or more vertical travel sections 502 and one or more horizontal travel sections 504. The shuttles 210 are configured to move in a vertical direction (i.e., up or down) along the vertical travel sections 502, and the shuttles 210 are configured to move in a horizontal direction (i.e., side to side) along the horizontal travel sections 504. The horizontal travel sections 504 in the shuttle frame 206 generally correspond to the various vertical storage levels in the buffering system 106. The vertical travel sections 502 provide an express route for the shuttles 210 to move to the various vertical levels and then once at a particular horizontal travel section 504 transition to that section. One or more switches 506 allow the shuttles 210 to transition between the vertical travel sections 502 and the horizontal travel sections 504 of the shuttle frame 206. For example, shuttles 210 loaded with SKUs can travel upward along the vertical travel section 502 of the shuttle frame 206, and once the desired level is reached, the switches 506 can be activated so that the shuttle 210 is able to move along the horizontal travel section for the particular level of the buffering system 106. Once the SKU is unloaded from the shuttle 210, the shuttle 210 can return to the infeed conveyor system 102 via the same vertical travel section 502 or a different one. The vertical travel sections 502 can be dedicated for a particular movement. For instance, one of the vertical travel sections 502 can only permit upward movement of the shuttles 210, and another vertical travel section 502 can only permit downward movement of the shuttles 210. Likewise, the horizontal travel sections 504 can be configured to allow the shuttles 210 to travel in one horizontal direction (e.g., left or right) or more than one direction.

Figure 6:
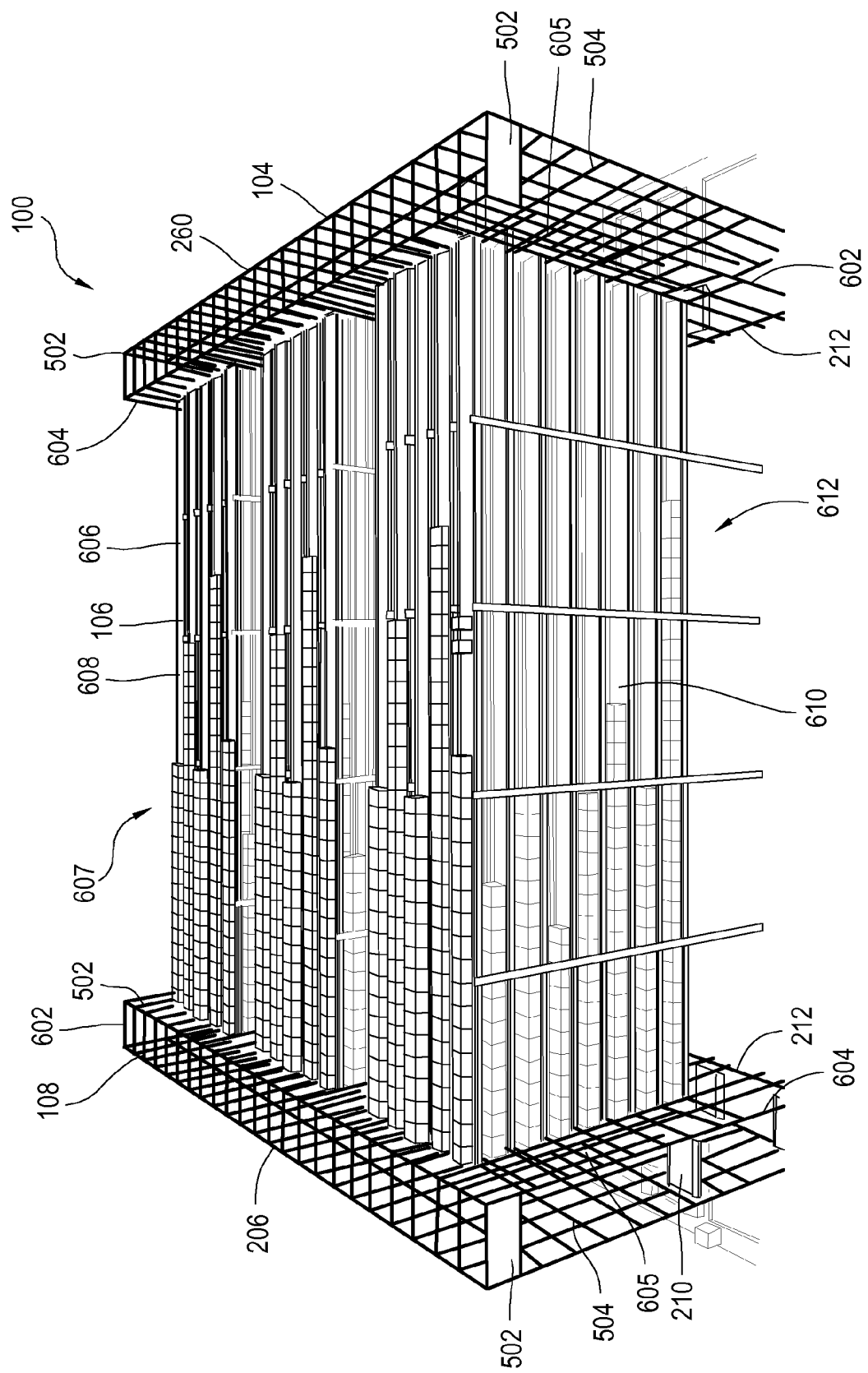
FIG. 6 is a top perspective view of the FIG. 1 flow buffer system.

Looking at FIG. 6, the vertical travel sections 502 of both the infeed shuttle system 104 and the discharge shuttle system 108 include dedicated departure travel lanes 602 and return travel lanes 604 for the shuttles 210. The horizontal travel sections of both the infeed shuttle system 104 and the discharge shuttle system 108 include the conveyor transfer sections 212 and one or more buffer transfer sections 605. The dedicated travel sections 602, 604 are used to recirculate the shuttles 210 within the shuttle systems 104, 110. At the departure lanes 602, the shuttles 210 leave the infeed 102 and discharge 110 conveyor systems and move vertically until the shuttles 210 reach the appropriate buffer transfer section 504. Once at the appropriate level, one or more switches 506 (FIG. 5) are switched so that the shuttle 210 is able to move along the appropriate buffer transfer section 605 and services the corresponding level of the buffering system 106. The shuttles 210 return back to the infeed 102 and discharge 108 shuttle systems by moving vertically along the return travel lanes 604. In the illustrated example, the shuttles 210 travel in an upward direction in the departure travel lanes 602 and travel in a downward direction in the return travel lanes 604. It should be recognized that in other examples the shuttles 210 can travel in different directions in the travel lanes 602, 604. For example, when the infeed 102 and discharge 110 conveyor systems are located at different levels besides on the floor of the warehouse, the shuttles 210 can travel in different directions in the departure 602 and return 604 travel lanes. As can be seen, the buffering system 106 is not positioned along these dedicated travel lanes 602, 604 so that the shuttles 210 do not have to stop in order to deliver or remove items or SKUs from the buffering system 106. By having be dedicated travel lanes 602, 604, the risk of bottlenecking or traffic jams of shuttles 210 is reduced. In other examples, the buffering system 106 can be aligned with one or more of the travel lanes 602, 604 such that the shuttles 210 are able to directly deliver or remove SKUs while in the travel lanes 602, 604. Alternatively or additionally, the shuttle systems 104, 108 can have a single travel lane for vertical movement of the shuttles 210 or more than two travel lanes 602, 604. In still yet other variations, the shuttle systems 104, 108 do not have any dedicated travel lanes 602, 604, but instead, the shuttles 210 are able to move both vertically and horizontally along any travel section. In other words, all or part of the tracks in the shuttle system 104, 108 are able to act as both vertical 502 and horizontal 504 travel sections.

The buffering system 106 in the illustrated example includes a plurality of buffer conveyors 606 arranged in an array 607 for storing or otherwise buffering SKUs. In the array 607, the conveyors 606 are horizontally arranged in rows (or columns) 608 and vertically in levels 610. In the illustrated example, the rows 608 and levels 610 are generally evenly spaced, but in other examples, the rows 608 and levels 610 in the array can be unevenly spaced. The buffer transfer sections 605 of the shuttle systems 104, 108 are aligned with corresponding levels 610 of the conveyors 606 so that the shuttles 210 are able to transfer SKUs to and from the conveyors in the buffering system 106. Each conveyor 606 is independently operable relative to one another and sections of the conveyor 606 are able to operate independently so as to index individual SKUs. In the illustrated example, the conveyors 606 include a series of belt conveyors, but in other examples, other types of powered and/or unpowered conveyors can be used. As can be seen, the buffering system 106 is raised so as to form a space or cavity 612 below. The space 612 can be used to store various types of SKUs that are not easily storable on the buffering system 106 and/or allow for the movement of vehicles, such as forklift trucks and even semitrailers, underneath the buffering system 106. With the space 612, the lowest row of conveyors 606 is raised so as to be not aligned with the sections of the infeed 104 and discharge 108 shuttle systems where SKUs are loaded and unloaded. By not having the ends of the conveyors 606 at these sections, any bottlenecking issues are avoided by a shuttle 210 having to stop along these sections so as to load or unload SKUs from the conveyors 606. In other examples, the conveyor 606 of the buffering system 106 can extend all the way to the floor of the facility such that there is no space 612. While the illustrated example shows evenly spaced rows 608 and levels 610 of conveyors 606, the conveyors 606 can be unevenly dispersed throughout all or part of the buffering system 106. In addition, different types of conveyor 606 can be used in the buffering system 106.

Figure 7:
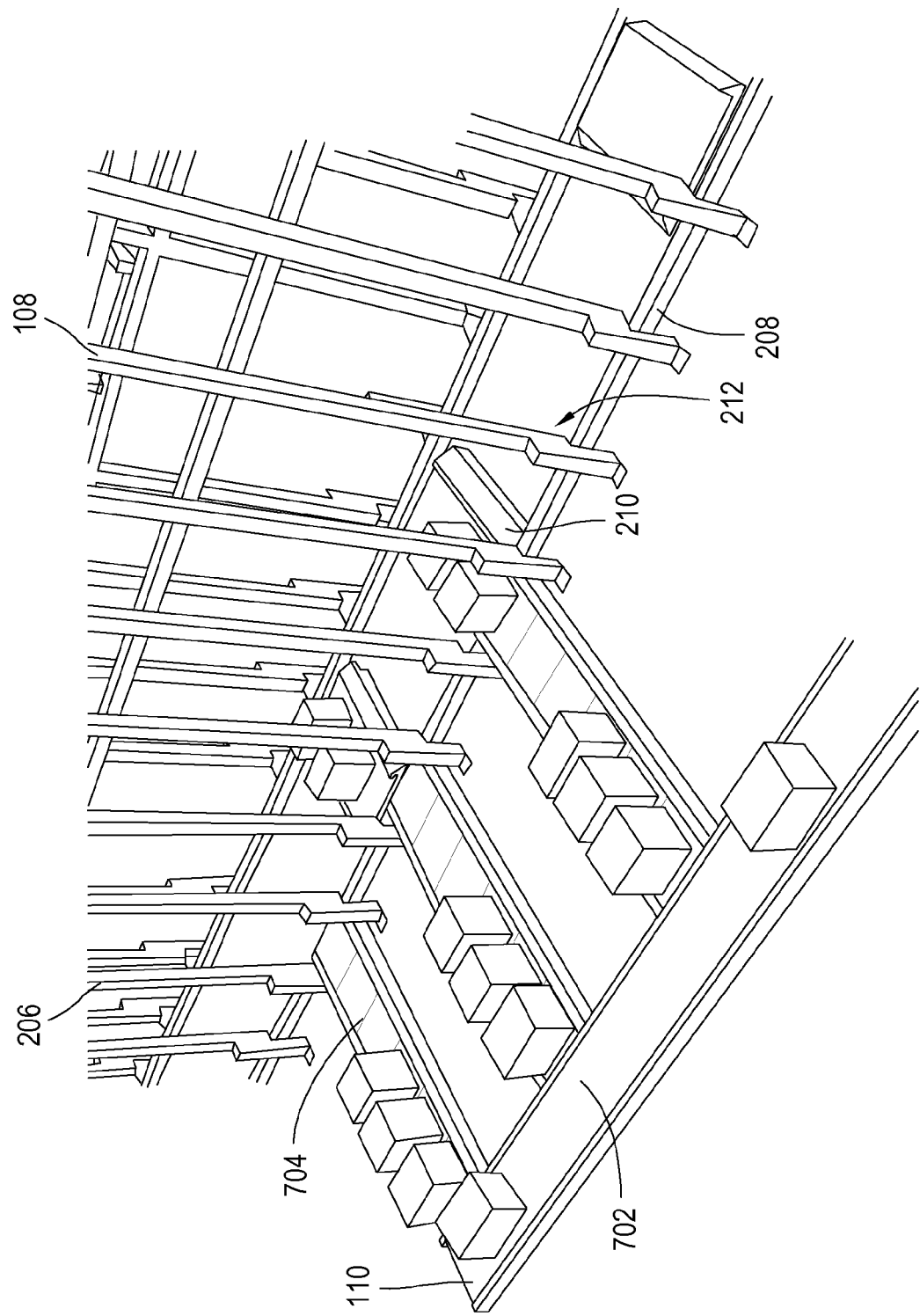
FIG. 7 is an enlarged perspective view of a discharge conveyor system used in the FIG. 1 flow buffer system.

FIG. 7 illustrates a large perspective view of the discharge conveyor system 110. As shown, the discharge conveyor system 110 includes a discharge conveyor 702 along with one or more discharge lanes 704. The discharge lanes 704 are positioned between the discharge conveyor 702 and the discharge shuttle system 108. The discharge lanes 704 are configured to receive SKUs from the shuttles 210 that travel along the transfer section 212 of the discharge shuttle system 108. In the illustrated example, the discharge conveyor system 110 includes three discharge lanes 704 so as to facilitate sorting and proper sequencing of the SKUs, but in other examples, the discharge conveyor system 110 can include more or less discharge lanes 704 as well as more or less discharge conveyors 702.

Figure 8:
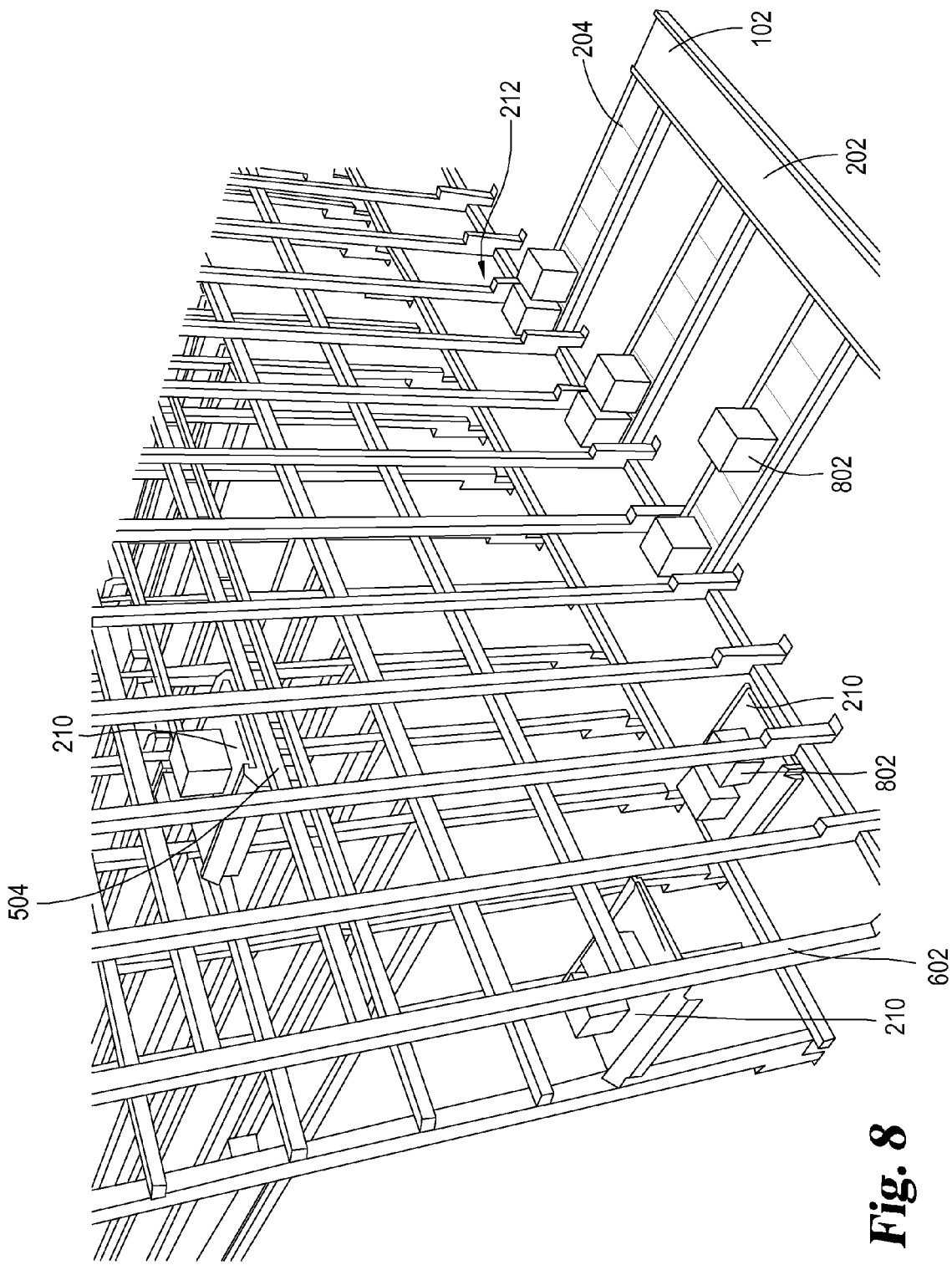
FIGS. 8, 9, 10, 11, and 12 illustrate a sequence of stages during the operation of the FIG. 1 flow buffer system.

A technique of operating the system 100 will now be described with reference to FIGS. 8-12. It should be recognized that this technique is performed using one or more system controllers, such as programmable logic controllers (PLCs), that control the operations of various conveyors, shuttles, switches, motors, outputs, and other components of the system 100. To locate the position and/or state of SKUs, shuttles 210, and other parts of the system 100, the controller receives inputs from various sensors throughout the system 100, such as proximity switches, barcode readers, RFID readers, photo eyes, and vision systems, to name just a few examples. FIG. 8 illustrates how SKUs 802 are processed on the infeed conveyor system 102. SKUs 802 are loaded onto the infeed conveyor 202 of the infeed conveyor system 102. The SKUs 802 can be loaded onto the infeed conveyor 202 manually, automatically, or via some combination of manual and automatic loading. For example, the SKUs 802 can be loaded onto the infeed conveyor 202 via forklift trucks or manually by warehouse personnel. In another example, the SKUs 802 are loaded onto the infeed conveyor 202 automatically via a robot. The infeed lanes 204 are configured to independently index or move the SKUs 802. Once one of the shuttles 210 is properly aligned with the infeed lanes 204 at the transfer section 212, one or more SKUs 802 can be loaded onto the shuttle 210. The infeed lanes 204 of the infeed conveyor system 102 are configured to sort and sequence SKUs 802 before loading on to the shuttles 210 of the infeed shuttle system 104. By pre-sorting the SKUs 802, the infeed shuttle system 104 is able to efficiently load the SKUs 802 into the buffering system 106. For instance, as shown, the shuttles 210 are able to handle more than one SKU 802 at a time so as to improve throughput at high volumes.

As depicted in FIG. 8, once the SKUs 802 are loaded, the shuttles 210 travel to the departure travel lanes 602. At the travel departure lanes, the shuttle moves in an upward direction to the level of the buffering system 106 where the SKU 802 is to be stored. Once the shuttle 210 is raised to the desired level, the switches 506 (see, FIG. 5) for that level are activated such that the shuttle 210 is able to travel along the horizontal travel section 504 for the level of the buffering system 106. The shuttles 210 provide greater flexibility in handling buffering demands. For instance, additional shuttles 210 can be added to the infeed shuttle system 104 under high demand or throughput situations, and shuttles 210 can be removed when demand is low. Moreover, the shuttles 210 can be readily replaced with other ones such as for servicing or repairs. Shuttles 210 can also be swapped between the infeed shuttle system 104 and the discharge shuttle system 108 depending on the needs of the system. For instance, when a large number of SKUs 802 are being shipped, shuttles 210 can be transferred from the infeed shuttle system 104 to the discharge shuttle system 108 so as to meet the demand.

Figure 9:
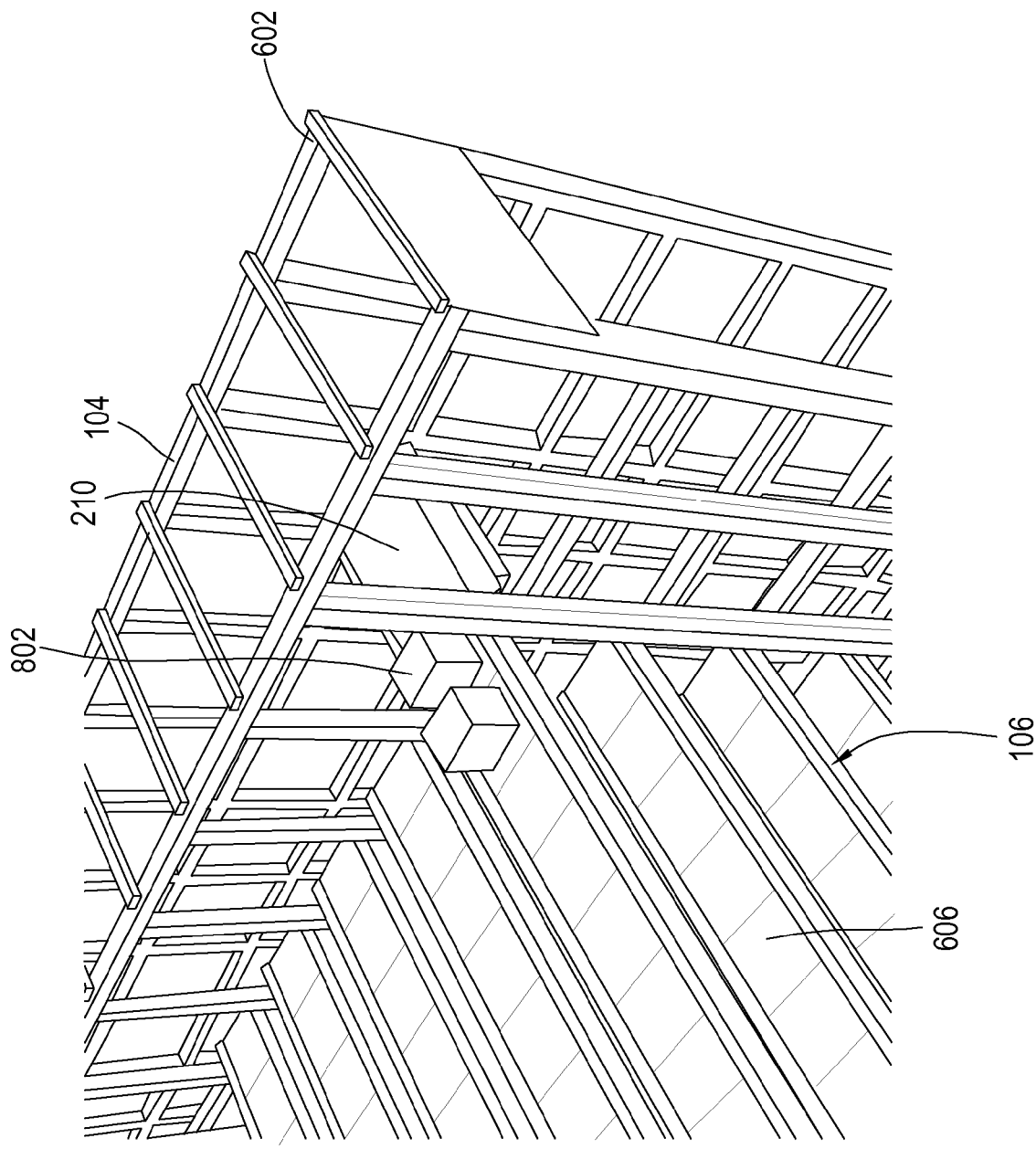

FIG. 9 shows the SKUs 802 being transferred from the shuttle 210 onto one of the conveyors 606 of the buffering system 106. After the SKUs 802 are unloaded, the shuttle 210 travels to the return travel lanes 604 so as to recirculate down to transfer section 212 so as to receive more SKUs 802. Additional SKUs 802 are loaded into the buffering system 106 via the infeed shuttle system 104 in the same manner that was previously described. The SKUs 802 are independently indexed and stored on the conveyors 606.

Figure 10:
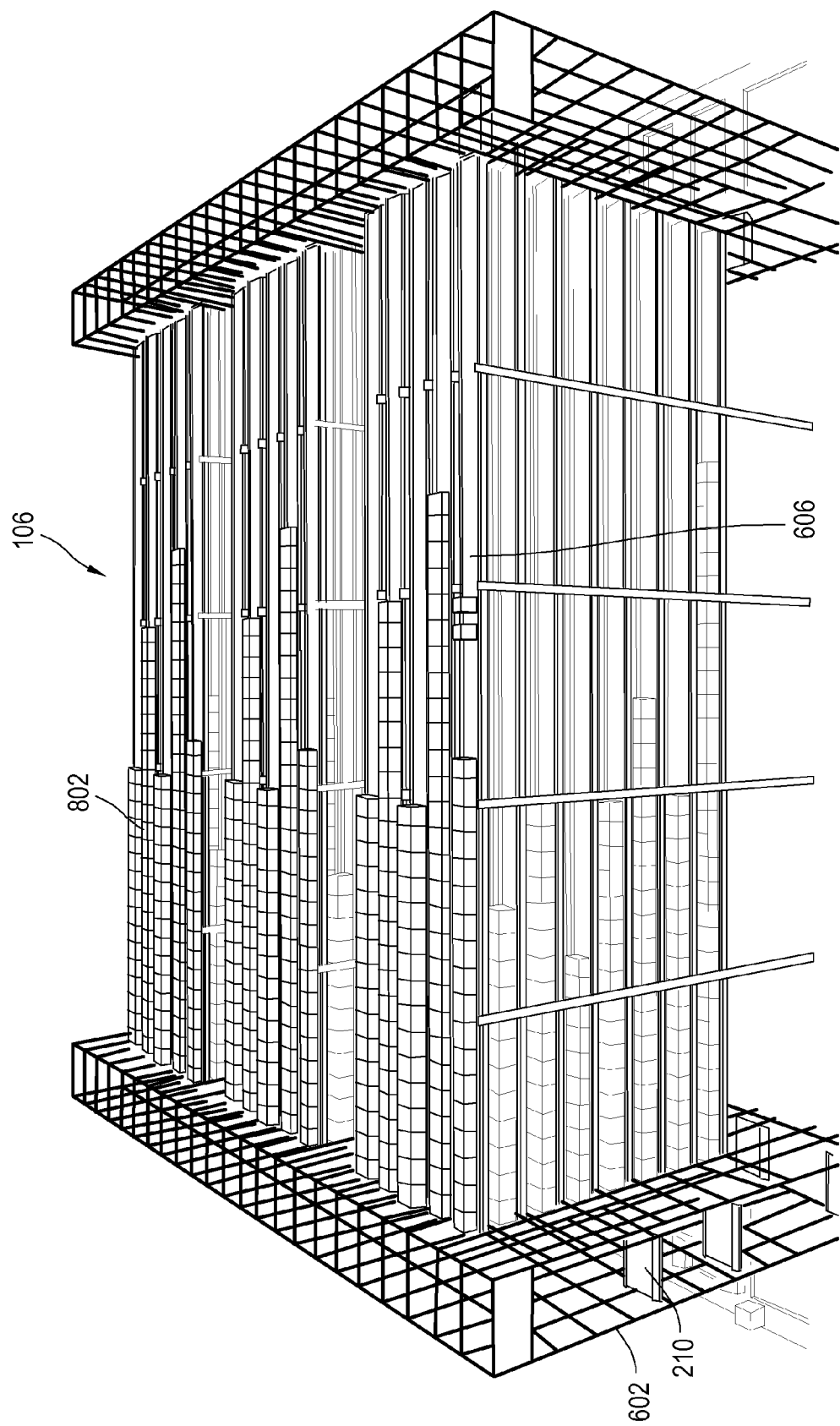

As shown in FIG. 10, the same type or similar SKUs 802 can be stored on the same conveyor 606 or groups of conveyors 606 in the buffering system 106. Moreover, storage of various types of SKUs 802 can be changed on-the-fly on the conveyors 606. For example, the same conveyor 606 can include different types of SKUs 802 so as to aid in proper sequencing of the SKUs 802 and/or handle varying demands for SKUs 802. It should be recognized that the buffering system 106 provides a compact, efficient storage or buffering of the various types of SKUs 802. When an order needs to be filled, one or more of the shuttles 210 travel the departure travel lanes 602 of the discharge shuttle system 108 until the shuttle 210 reaches the desired level where the SKU 802 is stored. Once the shuttle 210 is raised to the desired level, the switches 506 (see, FIG. 5) for that level are activated such that the shuttle 210 is able to travel along the horizontal travel section 504 for the level of the buffering system 106. The shuttle 210 travels along the horizontal travel section 504 until the shuttle 210 reaches the conveyor 606 on which the SKUs 802 that need to be processed are stored.

Figure 11:
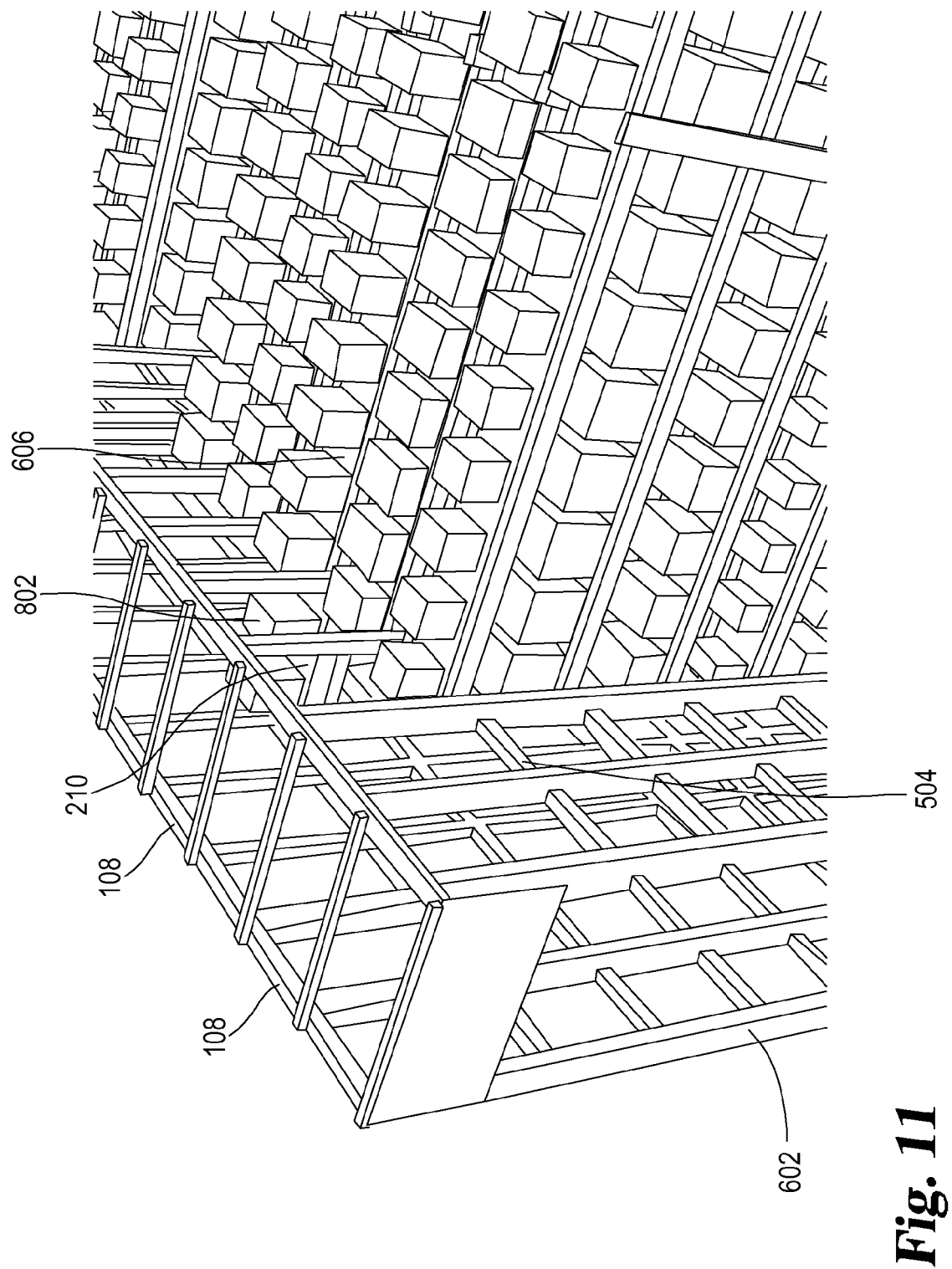

Once at the appropriate conveyors 606, the SKUs 802 are loaded onto the shuttle 210, as is depicted in FIG. 11. Although FIG. 11 illustrates two SKUs 802 being put it on to the shuttle 210, it should be recognized that more or less SKUs 802 can be loaded on shuttle 210 in other examples. The shuttle 210 with the SKUs then travels to the return travel lanes 604 (FIG. 6). The switches 506 at the return travel lane 604 are switched so that the shuttle 210 is able to travel down the return travel lanes 604. When the shuttle 210 reaches the transfer section 212 of the discharge shuttle system 108, the appropriate switches 506 are activated so that the shuttle 210 is able to travel on the transfer section 212 of the discharge shuttle system 108.

Figure 12:
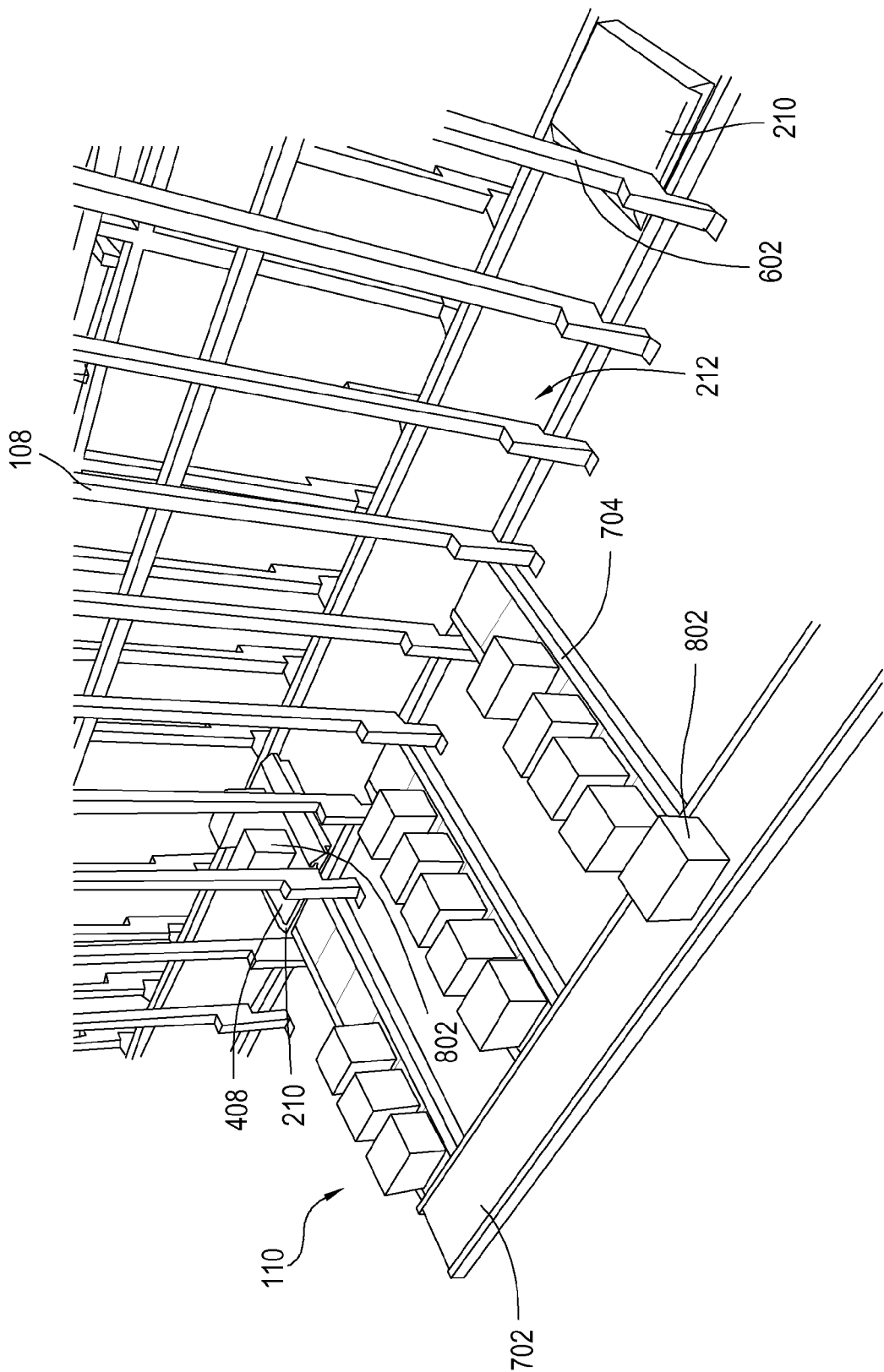

Looking at FIG. 12, the shuttle 210 travels along the transfer section 212 of the discharge shuttle system 108 until the shuttle 210 reaches one of the discharge lanes 704 of the discharge conveyor system 110. The conveyance mechanism 408 of the shuttle 210 is activated so as to transfer the SKUs 802 onto the discharge lane 704. The SKUs 802 on the discharge lane 704 can be buffered for proper sequencing and loading onto the discharge conveyor 702 of the discharge conveyor system 110. The shuttles 210 can be recirculated via the departure lanes 602 so as to pick up additional SKUs 802 in the buffering system 106. Additional SKUs 802 can be processed in a similar manner. Again, it should be recognized that throughput can be enhanced by having multiple discharge lanes 704 in the discharge conveyor system 110. While SKUs 802 are being loaded off of one or more of the shuttles 210, such as is shown in FIG. 7, other shuttles 210 at the same time can be moved into position and subsequently the unloaded shuttles 210 can be discharged to the departure lanes 602, such as is shown in FIG. 12.

The automated flow buffer system 100 is configured to buffer and process high volumes of SKUs 802 quickly and efficiently. As noted before with respect to FIG. 6, the conveyors 606 in the illustrated buffering system 106 are not located along the travel lanes 602, 604 as well as the transfer sections 212 of the shuttle systems 104, 108. This configuration forms U-shaped travel paths in the shuttle systems 104, 108 that are unobstructed such that the shuttles 210 are able to move in a serial fashion at high speeds without the risk of bottlenecks being created by shuttles 210 stopping to service a particular conveyor 606. Since there are multiple levels of conveyors 606 in the buffering system 106, there are multiple pathways within the shuttle systems 104, 108 such that multiple shuttles 210 can travel in parallel. By the shuttles travelling in parallel, shuttles 210 can be sequenced and/or re-routed to avoid any bottlenecks created by the time it takes to load or unload SKUs 802 from the shuttles 210 to the conveyors 606 of the buffering system 106. For instance, the same types of SKUs 802 can be dispersed within the buffering system 106 such that the SKUs 802 are stored on multiple conveyors 606 located in different rows 608 and/or levels 610. The automated flow buffer system 100 also provides greater operational flexibility. For instance, if needed, all or part of the automated buffer system 100 could be operated in reverse. As an example, the discharge conveyor system 110 and the discharge shuttle system 108 could be programmed to load SKUs 802 into the buffering system 106, and the infeed conveyor system 102 and the infeed shuttle system 104 can be used to unload SKUs 802 from the buffering system 106.

Both conveyor systems 102, 110 and shuttle systems 104, 108 can also be configured to operate in the same manner such that both are used to load or unload SKUs 802 from the buffering system 106 at the same time. For example, when maintenance of the buffering system 106 requires all SKUs to be removed from the buffering system 106 or there is high demand, both conveyor 102, 110 and shuttle 104, 108 systems can be used to quickly remove the SKUs 802 from the buffering system 106.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to the following terms or common variations thereof, including singular and plural forms:

Buffering system—is used in a broad sense to generally refer to a mechanism that is used to store items or SKUs on a temporary or near-temporary basis. In one form, the buffering system includes an array of conveyors that are arranged to store items both in a vertical and horizontal arrangement. The conveyors in the array can be arranged in a generally uniform manner so as to form a repeating pattern of conveyors or in a non-uniform manner. For example, the height or spacing of conveyors can be the same on all rows or levels of conveyors or different.

Conveyor—is used in a broad sense to generally refer to a mechanism that is used to transport something, like an item or SKU. By way of nonlimiting examples, the conveyor can include belt conveyors, wire mesh conveyors, chain conveyors, electric track conveyors, roller conveyors, cross-belt conveyors, vibrating conveyors, and skate wheel conveyors, to name just a few. The conveyor all or in part can be powered or unpowered. For instance, sections of the conveyors can include gravity feed sections.

Item or Stock Keeping Unit (SKU)—is used in a broad sense to generally refer to an individual article or thing. The item can come in any form and can be packaged or unpackaged.

For instance, items can be packaged in cases, cartons, bags, drums, containers, bottles, cans, pallets, and/or sacks, to name just a few examples. The item is not limited to a particular state of matter such that the item can normally have a solid, liquid, and/or gaseous form for example.

Lane—is used in a broad sense to generally refer to a portion or section of a conveyor that projects or branches off a main section of the conveyor.

Shuttle—is used in a broad sense to generally refer to a mechanism or device that is able to transport one or more items that are resting on and/or in the device. Each shuttle is capable to move independently of one another and is able to move in multiple directions (e.g., horizontally, vertically, diagonally, etc.) along a shuttle frame. In one example, the shuttle includes a drive mechanism that is configured to move the shuttle and a conveyance mechanism configured to convey or transfer items to and/or from the shuttle. The drive mechanism in one example includes wheels that are driven by an electric motor, but in other examples, the drive mechanism can be configured differently. For instance, the drive mechanism can include a hydraulic motor and/or a pneumatic motor. In one form, the conveyance mechanism includes a conveyor belt powered by an electric motor, but in other examples, the conveyance mechanism can be configured differently. For instance, the conveyance mechanism can include rollers, diverter boots, powered slats, and/or skates that are powered by electric, pneumatic, and/or hydraulic motors.

Shuttle System—is used in a broad sense to generally refer to a mechanism used to transport items via one or more shuttles that move along a shuttle frame. The shuttles in the shuttle system are able to at least move in two spatial directions (i.e., in a vertical direction and a horizontal direction) along the shuttle frame. In another form, the shuttle is able to move in all three spatial dimensions within the shuttle frame. The shuttle system can include an infeed shuttle system that typically (but not always) supplies items to a buffering system. The shuttle system can further include an discharge shuttle system that typically (but not always) discharges items from the buffering system.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. An automated flow buffer system, comprising:
   an infeed shuttle system;
   a discharge shuttle system;
   a buffering system disposed between the infeed shuttle system and the discharge shuttle system, the buffering system including a plurality of buffer conveyors arranged in an array to buffer one or more items; and
   the infeed shuttle system and the discharge shuttle system each including
      a shuttle frame disposed proximal to an end of the buffering system, the shuttle frame including
         two or more horizontal travel track sections extending in a horizontal direction, wherein the two or more horizontal travel track sections are spaced apart from one another in a vertical direction, and
         one or more vertical travel track sections extending in the vertical direction to provide a travel path between the horizontal travel track sections, and
      one or more shuttles independently moveable along the shuttle frame, each of the shuttles including
         a drive system configured to move the shuttle in the horizontal direction along the horizontal travel track sections of the shuttle frame and the vertical direction along the vertical travel track sections of the shuttle frame so that the shuttle is able to service the conveyors in the buffering system, and
         a conveyance mechanism upon which one or more of the items are transported, the conveyance mechanism being configured to convey the items to and/or from the buffer conveyors of the buffering system.

2. The system of claim 1, wherein the infeed shuttle system and the discharge shuttle are disposed at opposite ends of the buffering system to enhance buffering of the items in the shuttle system.

3. The system of claim 1, further comprising:
   an infeed conveyor system configured to convey the items to the infeed shuttle system; and
   a discharge conveyor system configured to convey the items from the discharge shuttle system.

4. The system of claim 3, wherein the infeed conveyor system includes
   an infeed conveyor, and
   one or more infeed lanes extending from the infeed conveyor to the infeed shuttle system.

5. The system of claim 4, wherein the infeed conveyor system includes two or more of the infeed lanes to enhance sequencing of the items into the infeed shuttle system.

6. The system of claim 1, wherein the infeed shuttle system includes two or more of the shuttles.

7. The system of claim 3, wherein the discharge conveyor system includes
   a discharge conveyor, and
   one or more discharge lanes extending from the discharge conveyor to the discharge shuttle system.

8. The system of claim 7, wherein the discharge conveyor system includes two or more of the discharge lanes to enhance sequencing of the items into the discharge shuttle system.

9. The system of claim 1, wherein the shuttle frame further includes:
   at least one conveyor transfer section;
   at least one departure travel lane;
   at least one return travel lane;
   wherein the departure travel lane and the return travel lane are located at opposite ends of the transfer section;
   wherein the shuttles are configured to move in a vertical direction along the departure and return travel lanes; and
   a plurality of buffer transfer sections disposed between the departure travel lane and the return travel lane, wherein each of the buffer transfer sections is aligned with a corresponding level of buffer conveyors so that the shuttles are able to service the buffer conveyors.

10. The system of claim 9, wherein the shuttle frame further includes one or more switches configured to transition the shuttles from the departure and return travel lanes to the buffer transfer sections.

11. The system of claim 9, wherein the return and departure travel lanes are unaligned with the buffer conveyors of the buffering system so that the shuttles on the return and departure travel lanes are unable to service the buffer conveyors to reduce bottlenecks.

12. The system of claim 11, wherein the conveyor transfer section is unaligned with the buffer conveyors of the buffering system so that the shuttles on the conveyor transfer section are unable to service the buffer conveyors to reduce bottlenecks.

13. The system of claim 1, wherein the buffering system is raised to form a cavity for facilitating movement under the buffering system.

14. The system of claim 1, wherein the array includes a plurality of rows and levels of the buffer conveyors.

15. The system of claim 1, wherein the drive system includes a plurality of wheels configured to propel the shuttles along both the horizontal travel track sections and the vertical travel track sections.

16. The system of claim 1, wherein:
the array includes a plurality of levels of the buffer conveyors that are spaced in the vertical direction; and
the horizontal travel track sections are positioned to align with the levels of the buffer conveyors in the vertical direction.

17. The system of claim 1, wherein the shuttle frame includes two or more of the vertical travel track sections that are spaced apart from one another in the horizontal direction.

18. An automated flow buffer system, comprising:
an infeed shuttle system;
a discharge shuttle system;
a buffering system disposed between the infeed shuttle system and the discharge shuttle system, the buffering system including a plurality of buffer conveyors arranged in an array to buffer one or more items;
the infeed shuttle system and the discharge shuttle system each including
a shuttle frame disposed proximal to an end of the buffering system, and
one or more shuttles independently moveable along the shuttle frame, each of the shuttles including
a drive system configured to move the shuttle in a horizontal direction and a vertical direction along the shuttle frame so that the shuttle is able to service the conveyors in the buffering system, and
a conveyance mechanism upon which one or more of the items are transported, the conveyance mechanism being configured to convey the items to and/or from the buffer conveyors of the buffering system;
an infeed conveyor system configured to convey the items to the infeed shuttle system; and
a discharge conveyor system configured to convey the items from the discharge shuttle system, wherein the discharge conveyor system includes
a discharge conveyor, and
two or more discharge lanes extending from the discharge conveyor to the discharge shuttle system to enhance sequencing of the items into the discharge shuttle system.

19. The system of claim 18, wherein the infeed shuttle system and the discharge shuttle are disposed at opposite ends of the buffering system to enhance buffering of the items in the shuttle system.

20. The system of claim 18, wherein the array includes a plurality of rows and levels of the buffer conveyors.

21. The system of claim 18, wherein the drive system includes a plurality of wheels configured to propel the shuttles in the horizontal direction and the vertical direction.

22. The system of claim 18, wherein:
the array includes a plurality of levels of the buffer conveyors that are spaced in the vertical direction; and
the shuttle frame includes two or more horizontal travel track sections positioned to align with the levels of the buffer conveyors in the vertical direction.

23. The system of claim 18, wherein the shuttle frame includes two or more vertical travel track sections that are spaced apart from one another in the horizontal direction.

24. The system of claim 18, wherein the discharge shuttle system includes two or more of the shuttles.

25. An automated flow buffer system, comprising:
an infeed shuttle system;
a discharge shuttle system;
a buffering system disposed between the infeed shuttle system and the discharge shuttle system, the buffering system including a plurality of buffer conveyors arranged in an array to buffer one or more items;
the infeed shuttle system and the discharge shuttle system each including
a shuttle frame disposed proximal to an end of the buffering system, and
one or more shuttles independently moveable along the shuttle frame, each of the shuttles including
a drive system configured to move the shuttle in a horizontal direction and a vertical direction along the shuttle frame so that the shuttle is able to service the conveyors in the buffering system, and
a conveyance mechanism upon which one or more of the items are transported, the conveyance mechanism being configured to convey the items to and/or from the buffer conveyors of the buffering system;
an infeed conveyor system configured to convey the items to the infeed shuttle system, wherein the infeed conveyor system includes
an infeed conveyor, and
two or more infeed lanes extending from the infeed conveyor to the infeed shuttle system to enhance sequencing of the items into the infeed shuttle system; and
a discharge conveyor system configured to convey the items from the discharge shuttle system.

26. The system of claim 25, wherein the infeed shuttle system and the discharge shuttle are disposed at opposite ends of the buffering system to enhance buffering of the items in the shuttle system.

27. The system of claim 25, wherein the array includes a plurality of rows and levels of the buffer conveyors.

28. The system of claim 25, wherein the drive system includes a plurality of wheels configured to propel the shuttles in the horizontal direction and the vertical direction.

29. The system of claim 25, wherein:
the array includes a plurality of levels of the buffer conveyors that are spaced in the vertical direction; and
the shuttle frame includes two or more horizontal travel track sections positioned to align with the levels of the buffer conveyors in the vertical direction.

30. The system of claim 25, wherein the shuttle frame includes two or more vertical travel track sections that are spaced apart from one another in the horizontal direction.

31. The system of claim 25, wherein the infeed shuttle system includes two or more of the shuttles.

32. A method, comprising:
loading one or more items onto an infeed shuttle of an infeed shuttle system;
moving the infeed shuttle in a vertical direction in the infeed shuttle system to a level of a buffering system that includes an array of buffer conveyors arranged in multiple rows and levels;
moving the infeed shuttle in a horizontal direction to one of the buffer conveyors on the level;
transferring the items from the infeed shuttle to the buffer conveyor via a conveyance mechanism of the infeed shuttle;
buffering the items on the buffer conveyor of the buffering system;
transferring the items from the buffer conveyor to a discharge shuttle of a discharge shuttle system, wherein the buffering system is sandwiched between the infeed shuttle system and the discharge shuttle system;

moving the discharge shuttle to a transfer section of the discharge shuttle system;
unloading the items from the discharge shuttle at the transfer section of the discharge shuttle system; and
moving a second infeed shuttle with one or more second items to a second one of the buffer conveyors on a second different level; and
transferring the items from the second infeed shuttle to the second buffer conveyor.

33. The method of claim 32, further comprising:
conveying the items to the infeed shuttle system with an infeed conveyor system; and
conveying the items from the discharge shuttle system with a discharge conveyor system.

34. The method of claim 33, further comprising:
sequencing the items with two or more infeed lanes of the infeed conveyor system; and
sequencing the items with two or more discharge lanes of the discharge conveyor system.

35. The method of claim 32, further comprising:
wherein the infeed shuttle system and the discharge shuttle system each include a conveyor transfer section, a departure travel lane, and a return travel lane that are offset from the buffering system; and
recirculating the shuttles of the infeed shuttle system and the discharge shuttle system along the conveyor transfer section, the departure travel lane, and the return travel lane without transferring the items to the buffer conveyors of the buffering system.

36. The method of claim 32, further comprising:
transitioning the infeed shuttle from the vertical direction to the horizontal direction by activating one or more switches in the infeed shuttle system before said moving the infeed shuttle in the horizontal direction.

37. An automated flow buffer system, comprising:
an infeed shuttle system;
a discharge shuttle system;
a buffering system disposed between the infeed shuttle system and the discharge shuttle system, the buffering system including a plurality of buffer conveyors arranged in an array to buffer one or more items;
the infeed shuttle system and the discharge shuttle system each including
a shuttle frame disposed proximal to an end of the buffering system, wherein the shuttle frame includes
at least one conveyor transfer section,
at least one departure travel lane,
at least one return travel lane,
wherein the departure travel lane and the return travel lane are located at opposite ends of the transfer section,
wherein the shuttles are configured to move in a vertical direction along the departure and return travel lanes, and
a plurality of buffer transfer sections disposed between the departure travel lane and the return travel lane, wherein each of the buffer transfer sections is aligned with a corresponding level of buffer conveyors so that the shuttles are able to service the buffer conveyors, and
one or more shuttles independently moveable along the shuttle frame, each of the shuttles including
a drive system configured to move the shuttle in a horizontal direction and a vertical direction along the shuttle frame so that the shuttle is able to service the conveyors in the buffering system, and
a conveyance mechanism upon which one or more of the items are transported, the conveyance mechanism being configured to convey the items to and/or from the buffer conveyors of the buffering system.

38. The system of claim 37, wherein the shuttle frame further includes one or more switches configured to transition the shuttles from the departure and return travel lanes to the buffer transfer sections.

39. The system of claim 37, wherein the return and departure travel lanes are unaligned with the buffer conveyors of the buffering system so that the shuttles on the return and departure travel lanes are unable to service the buffer conveyors to reduce bottlenecks.

40. The system of claim 39, wherein the conveyor transfer section is unaligned with the buffer conveyors of the buffering system so that the shuttles on the conveyor transfer section are unable to service the buffer conveyors to reduce bottlenecks.

41. The system of claim 37, wherein the drive system includes a plurality of wheels configured to propel the shuttles in the horizontal direction and the vertical direction.

42. The system of claim 37, wherein the infeed shuttle system and the discharge shuttle system each include two or more of the shuttles.

43. A method, comprising:
loading one or more items onto an infeed shuttle of an infeed shuttle system;
moving the infeed shuttle in a vertical direction in the infeed shuttle system to a level of a buffering system that includes an array of buffer conveyors arranged in multiple rows and levels;
moving the infeed shuttle in a horizontal direction to one of the buffer conveyors on the level;
transferring the items from the infeed shuttle to the buffer conveyor via a conveyance mechanism of the infeed shuttle;
buffering the items on the buffer conveyor of the buffering system;
transferring the items from the buffer conveyor to a discharge shuttle of a discharge shuttle system, wherein the buffering system is sandwiched between the infeed shuttle system and the discharge shuttle system;
moving the discharge shuttle to a transfer section of the discharge shuttle system;
unloading the items from the discharge shuttle at the transfer section of the discharge shuttle system;
wherein the infeed shuttle system and the discharge shuttle system each include a conveyor transfer section, a departure travel lane, and a return travel lane that are offset from the buffering system; and
recirculating the shuttles of the infeed shuttle system and the discharge shuttle system along the conveyor transfer section, the departure travel lane, and the return travel lane without transferring the items to the buffer conveyors of the buffering system.

44. The method of claim 43, further comprising:
conveying the items to the infeed shuttle system with an infeed conveyor system; and
conveying the items from the discharge shuttle system with a discharge conveyor system.

45. The method of claim 44, further comprising:
sequencing the items with two or more infeed lanes of the infeed conveyor system; and
sequencing the items with two or more discharge lanes of the discharge conveyor system.

46. The method of claim 43, further comprising:
transitioning the infeed shuttle from the vertical direction to the horizontal direction by activating one or more switches in the infeed shuttle system before said moving the infeed shuttle in the horizontal direction.

\* \* \* \* \*